United States Patent
Bernart

(10) Patent No.: US 12,187,086 B2
(45) Date of Patent: Jan. 7, 2025

(54) FOLDABLE BALL HITCH

(71) Applicant: Francis Bernart, Akron, OH (US)

(72) Inventor: Francis Bernart, Akron, OH (US)

(73) Assignee: bROK Products, LLC, Akron, OH (US)

( * ) Notice: Subject to any disclaimer, the term of this patent is extended or adjusted under 35 U.S.C. 154(b) by 368 days.

(21) Appl. No.: 17/751,829

(22) Filed: May 24, 2022

(65) Prior Publication Data

US 2022/0379674 A1  Dec. 1, 2022

Related U.S. Application Data

(60) Provisional application No. 63/192,751, filed on May 25, 2021.

(51) Int. Cl.
*B60D 1/54* (2006.01)
*B60D 1/06* (2006.01)

(52) U.S. Cl.
CPC .......... *B60D 1/54* (2013.01); *B60D 1/06* (2013.01); *B60D 2001/544* (2013.01)

(58) Field of Classification Search
CPC ... B60D 1/54; B60D 1/06; B60D 1/46; B60D 2001/544
See application file for complete search history.

(56) References Cited

U.S. PATENT DOCUMENTS

| | | | |
|---|---|---|---|
| 4,540,194 A | 9/1985 | Dane | |
| 4,570,966 A * | 2/1986 | Giboney | B62D 53/0842 280/433 |
| 5,465,991 A * | 11/1995 | Kass | B60D 1/345 280/490.1 |
| 5,934,698 A | 8/1999 | Despain | |
| 6,712,381 B1 | 3/2004 | Moss | |
| 6,789,815 B2 * | 9/2004 | Moss | B60D 1/06 280/491.1 |
| 6,908,095 B2 | 6/2005 | Reutlinger et al. | |
| 6,932,375 B2 | 8/2005 | Zahn | |
| 6,974,148 B2 | 12/2005 | Moss et al. | |
| 7,029,022 B2 | 4/2006 | Moss | |
| 7,195,268 B1 | 3/2007 | Williams, Jr. | |
| 7,204,505 B2 | 4/2007 | Moss | |
| 7,255,362 B2 | 8/2007 | Smith | |
| 7,451,996 B2 | 11/2008 | Miles et al. | |
| 7,559,570 B2 | 7/2009 | Cearns | |

(Continued)

FOREIGN PATENT DOCUMENTS

| | | |
|---|---|---|
| CN | 205086621 | 3/2016 |
| CN | 106466996 A | 3/2017 |
| CN | 106466996 B | 10/2018 |

*Primary Examiner* — Kevin Hurley
(74) *Attorney, Agent, or Firm* — Dominic A. Frisina

(57) ABSTRACT

A folding trailer hitch is provided. The hitch includes a pair of bracket sidewalls each having two parallel columns of indexing holes. A hitch plate is included having a ball mount portion and an indexing portion. The indexing portion includes an upper indexing channel extending from an upper opening in a first side of the indexing portion to an upper opening in a second side of the indexing portion. The indexing portion also includes a lower indexing channel parallel to the first indexing channel and extending from a lower opening in a first side of the indexing portion to a lower opening in a second side of the indexing portion.

11 Claims, 4 Drawing Sheets

(56) References Cited

U.S. PATENT DOCUMENTS

| | | |
|---|---|---|
| 8,033,563 B2 | 10/2011 | Good |
| 8,177,252 B2 | 5/2012 | Tambornino |
| 8,408,577 B2 | 4/2013 | Works |
| 8,979,112 B2 | 3/2015 | Weipert et al. |
| 9,387,739 B2 * | 7/2016 | Babuska .................. B60D 1/52 |
| 9,457,631 B1 | 10/2016 | Kennemer et al. |
| 10,857,846 B1 | 12/2020 | Jacobs |
| 11,554,622 B2 * | 1/2023 | Garcia ..................... B60D 1/06 |
| 11,660,916 B2 * | 5/2023 | Singh ..................... B60D 1/065 |
| | | 280/490.1 |

* cited by examiner

FOLDABLE BALL HITCH

I. BACKGROUND OF THE INVENTION

A. Field of Invention

The invention generally relates to the field of towing devices for land vehicles.

B. Description of the Related Art

Ball hitches have long been used for hauling trailers behind various on-road and off-road vehicles such as trucks. A wide variety of ball hitch designs are known in the art solving certain unique problems. For instance, it is known to have a ball hitch that can be stowed or deployed without removing it from the vehicle. It is also known to use indexing pins to raise and lower hitches.

Some embodiments of the present invention may provide one or more benefits or advantages over the prior art.

II. SUMMARY OF THE INVENTION

Embodiments provide a folding trailer hitch. The folding hitch comprises a shank; a bracket adjoined at a rear wall of the bracket to an end of the shank, wherein the bracket includes a first sidewall extending from the rear wall and a second sidewall extending from the rear wall; the first sidewall of the bracket having at least two columns of indexing holes; the second sidewall of the bracket having at least two columns of indexing holes; a hitch plate having a ball mount portion, a ball mounting aperture located in the ball mounting portion, and an indexing portion; an upper indexing channel extending from an upper opening in a first side of the indexing portion to an upper opening in a second side of the indexing portion; and a lower indexing channel parallel to the first indexing channel and extending from a lower opening in a first side of the indexing portion to a lower opening in a second side of the indexing portion.

Embodiments may further comprise a ball hitch cooperatively engaging the ball mount portion of the hitch plate.

Embodiments may further comprise a pair of indexing pins engageably receivable by the upper indexing channel and the lower indexing channel.

In some embodiments the ball mount portion of the hitch plate is receivable between the first sidewall of the bracket and the second sidewall of the bracket.

In some embodiments a ball hitch is receivable between the first sidewall of the bracket and the second sidewall of the bracket.

In some embodiments the second sidewall is parallel to the first side wall.

In some embodiments the at least two columns of indexing holes in the first sidewall of the bracket are parallel to each other and linearly arranged.

In some embodiments the at least two columns of indexing holes in the second sidewall of the bracket are parallel to each other and linearly arranged.

Other benefits and advantages will become apparent to those skilled in the art to which it pertains upon reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof, wherein like reference numerals indicate like structure.

IV. DETAILED DESCRIPTION OF THE INVENTION

As used herein the terms "embodiment", "embodiments", "some embodiments", "other embodiments" and so on are not exclusive of one another. Except where there is an explicit statement to the contrary, all descriptions of the features and elements of the various embodiments disclosed herein may be combined in all operable combinations thereof.

Language used herein to describe process steps may include words such as "then" which suggest an order of operations; however, one skilled in the art will appreciate that the use of such terms is often a matter of convenience and does not necessarily limit the process being described to a particular order of steps.

Conjunctions and combinations of conjunctions (e.g. "and/or") are used herein when reciting elements and characteristics of embodiments; however, unless specifically stated to the contrary or required by context, "and", "or" and "and/or" are interchangeable and do not necessarily require every element of a list or only one element of a list to the exclusion of others.

Terms of degree, terms of approximation, and/or subjective terms may be used herein to describe certain features or elements of the invention. In each case sufficient disclosure is provided to inform the person having ordinary skill in the art in accordance with the written description requirement and the definiteness requirement of 35 U.S.C. 112.

Figure 1:
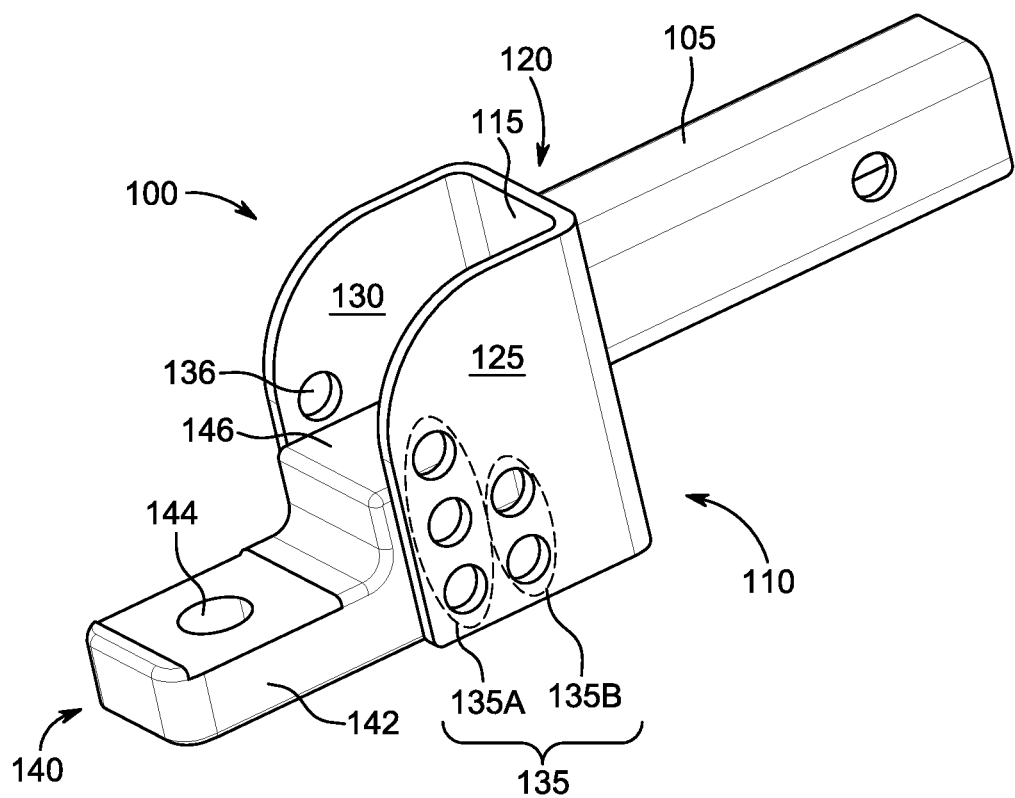
FIG. 1 is a perspective view of an embodiment.

Referring now to the drawings wherein the showings are for purposes of illustrating embodiments of the invention only and not for purposes of limiting the same, FIG. 1 is a partial perspective view three-dimensional rendering of an embodiment 100. The embodiment 100 includes a shank 105 receivable by a trailer hitch receiver (not shown). A bracket 110 is adjoined at a rear wall 115 of the bracket 110 to an end 120 of the shank, wherein the bracket 110 includes a first sidewall 125, and a second sidewall 130 more or less parallel to the first sidewall 125. The person having ordinary skill will understand that the invention is not limited to parallel sidewalls. The sidewalls may be obliquely oriented to each other, and/or may have a more complex shape, provided that sufficient clearance is included to receive the indexing portion 146 and the ball mount portion 142 of the hitch plate 140. The first sidewall 125 of the bracket 110 has two parallel linear columns 135A, 135B of indexing holes 135. As shown in FIG. 1, a first column 135A includes three indexing holes, and a second column 135B has two indexing holes.

The reason for the differing number of indexing holes in columns 135A and 135B is illustrated with reference to FIGS. 3 and 4. More specifically, one fewer indexing hole is provided in column 135B (and 136B) because the hitch plate 140 pivots on its lower indexing channel 248L to reposition between deployed and stowed configurations. While deployed, the upper indexing channel 248U and the lower indexing channel 248L of the hitch plate 140 receive indexing pins 260 through the indexing holes 135, 136 of the first columns 135A, 136A of the first and second sidewalls 125, 130. The hitch plate 140 is moved to a stowed configuration by removing the indexing pin 260 from the upper indexing channel 248U and pivoting the hitch plate 140 into the bracket 110 on the lower indexing pin 260 in the lower indexing channel 248L. The hitch plate is fixed in the stowed configuration with an indexing pin 260 cooperating with the upper indexing channel 248U of the hitch plate through a pair of indexing holes 135, 136 in the second columns 135B, 136B of the respective sidewalls 125, 130. Therefore, the uppermost deployed configuration requires one more indexing hole in columns 135A, 136A than the uppermost stowed configuration requires in columns 135B, 136B. As used here, the terms upper, uppermost, or lower are not intended to limit the invention to a particular orientation. Rather, the embodiment could be inverted, or the indexing holes 135, 136 could be rearranged, without departing from the scope of the invention.

Similarly, the second sidewall 130 has a set of indexing holes 136 matching that of the first sidewall 125, one of which is visible in FIG. 1. The embodiment 100 further includes a hitch plate 140 having a ball mount portion 142 including a ball mounting aperture 144 and an indexing portion 146. Though the columns of indexing holes of the sidewalls 125, 130 illustrated here are shown and described as linear columns, the invention is not limited to columns that are linear or evenly spaced. For instance, the spacing between indexing holes may vary along columns and/or rows of indexing holes. Such variability may provide flexibility in positioning a hitch plate 140, and/or may provide space for storage of spare parts including but not limited to spare hitch plates and indexing pins 260.

With continuing reference to FIG. 1, the invention is not limited to brackets 110 having two columns of indexing holes 135, 136 nor is the invention limited to columns having three indexing holes (e.g. 135A) and two indexing holes (e.g. 135B). Adding indexing holes to the columns provides additional options for positioning the hitch plate 140 in various deployed and/or stowed configurations. For example, with reference to FIG. 2, providing additional indexing holes 135, 136 to the columns 135A, 135B on the first sidewall 125 and additional columns 136A, 136B on the second sidewall 130 would allow for additional options for vertically positioning the hitch plate 140.

Similarly, embodiments also include sidewalls 125, 130 having greater than two columns of indexing holes 135, 136. For instance, providing three or more columns of indexing holes allows for greater flexibility in horizontally positioning the hitch plate 140. Further, providing four or more columns of indexing holes allows for still greater flexibility and additionally allows for storage of spare hitch plates 140. For instance, a user may have a plurality of hitch plates 140 with different sized balls 270 for hauling different trailers. The unused hitch plates 140 can be fixed with indexing pins 260 in a stowed configuration in a third and fourth column (not shown) of indexing holes.

Figure 2:
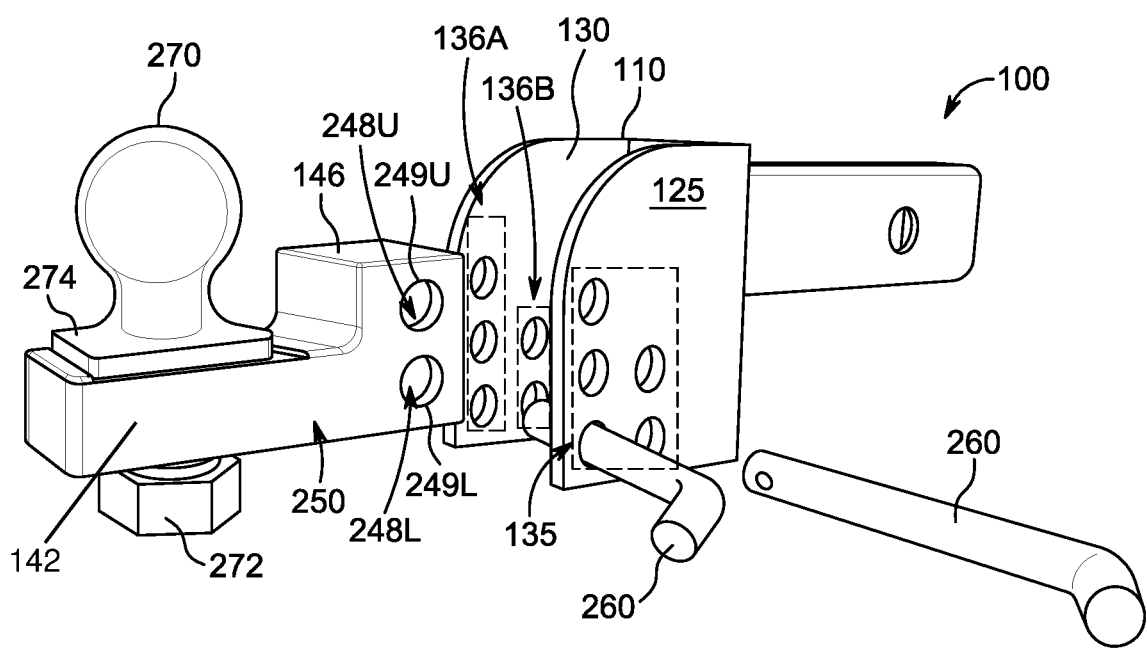
FIG. 2 is a partially disassemble view showing the hitch plate separate from the bracket.

FIG. 2 shows the indexing portion 146 unobstructed by the bracket 110. An opening 249U of an upper indexing channel 248U is shown in the first side 250 of the indexing portion 146. An opening 249L of a lower indexing channel 248L is also shown in the first side 250 of the indexing portion 146. The upper and lower openings 249U, 249L of indexing channels 248U, 248L cooperatively align with indexing holes 135, 136 of the brackets' first and second sidewalls 125, 130 such that, as shown in FIGS. 2 through 4, two indexing pins 260 may be received simultaneously by the indexing channels 248U, 248L; two indexing holes 135 of the first sidewall 125; and, two indexing holes 136 of the second sidewall 130. The person having ordinary skill will readily understand that the upper and lower indexing channels 248U, 248L also have upper and lower openings 249U, 249L on a second side of the indexing portion 146, though the second side is out of view.

Figure 3:
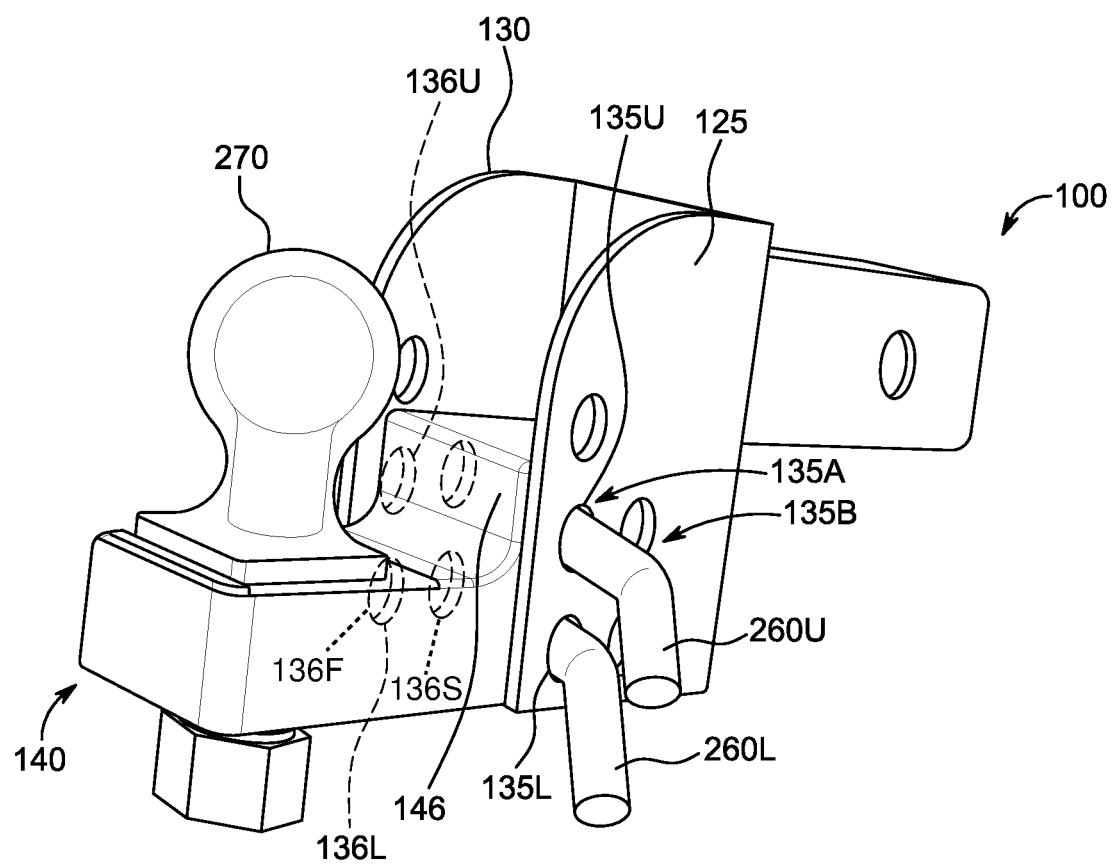
FIG. 3 is a perspective view showing an assembled embodiment in a deployed configuration.
Figure 4:
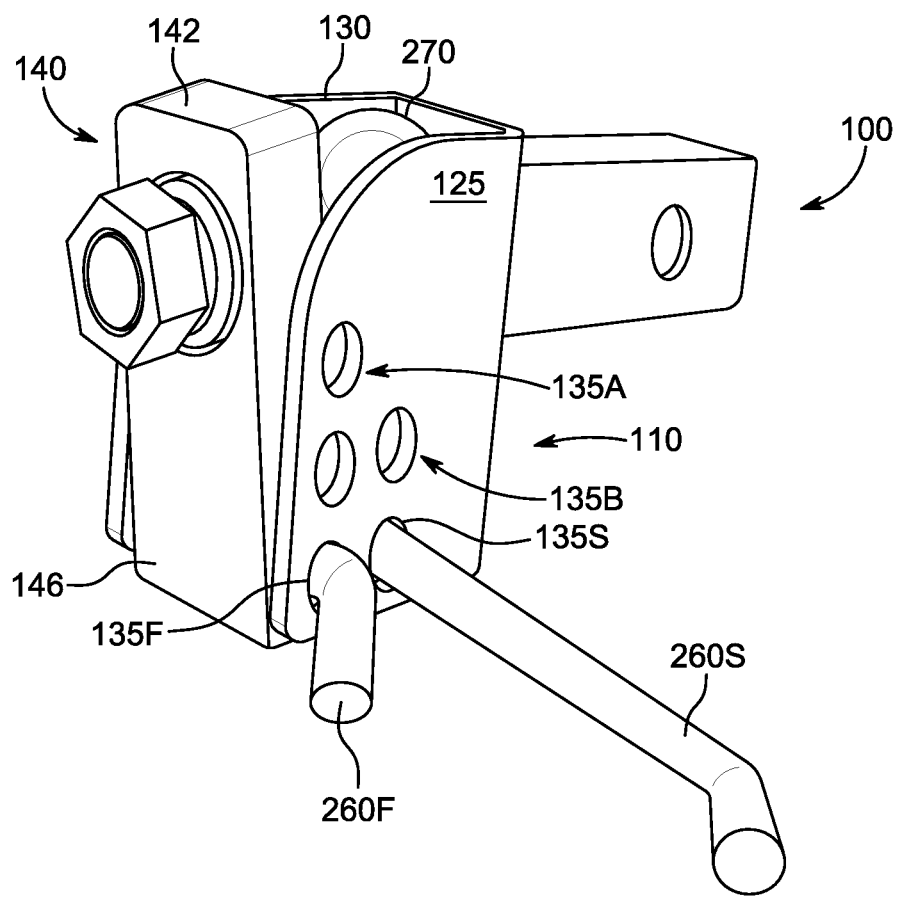
FIG. 4 is a perspective view showing an assembled embodiment in a stowed configuration.

FIGS. 2-4 cooperatively illustrate that the configuration of an embodiment 100 may be switched between deployed (FIG. 3) and stowed (FIG. 4) through repositioning the indexing pins 260. More specifically, in FIG. 3 the embodiment 100 is shown with both indexing pins 260 in the first column 135A of indexing holes, namely, the second and third indexing holes from the top of column 135A. This pin configuration corresponds to a deployed ball hitch configuration in the lowermost vertical position. The illustrated embodiment has two vertical positioning options; however, additional indexing holes 135, 136 could be added to embodiments to provide for additional vertical positioning options. In comparison, FIG. 4 shows one indexing pin 260 moved from the middle of the first column 135A, where it was labeled 260U in FIG. 3, to the bottom of the second column 135B where it is relabeled 260S in FIG. 4. The change in labeling is only intended to indicate a change of position of the same structure, rather than to indicate a different structure. 260U indicates an upper positioning, while 260S indicates the second of two pins. The pin configuration illustrated in FIG. 4 corresponds to a stowed ball hitch configuration.

As shown in FIG. 3 a deployed configuration is illustrated by an upper indexing pin 260U being engageably received simultaneously by an upper indexing hole 135U in column 135A of the first sidewall 125, an upper indexing hole 136U in column 136A of the second sidewall 130, and an upper indexing channel 248U (FIG. 2) of the indexing portion 146 of the hitch plate 140. The deployed configuration is further illustrated by a lower indexing pin 260L being engageably received simultaneously by a lower indexing hole 135L in column 135A of the first sidewall 125, a lower indexing hole 136L in column 136A of the second sidewall 130, and a lower indexing channel 248L (see FIG. 2) of the indexing portion 146 of the hitch plate 140. The upper indexing pin 260U and the lower indexing pin 260L are thus, engageably received. As used herein in connection with indexing pins, the term engageably receivable means an indexing pin structured such that it is capable of engaging an indexing hole of a hitch plate substantially as described above.

As shown in FIG. 4 a stowed configuration is illustrated by a first indexing pin 260F being engageably received simultaneously by a first indexing hole 135F in column 135A of the first sidewall 125, a first indexing hole 136F (FIG. 3) in column 136A (FIG. 2) of the second sidewall 130, and a lower indexing channel 248L (FIG. 2) of the indexing portion 146 of the hitch plate 140. The stowed configuration is further illustrated by a second indexing pin 260S being engageably received simultaneously by a second indexing hole 135S in column 135B of the first sidewall 125, a second indexing hole 136S (FIG. 3) in column 136B (FIG. 2) of the second sidewall 130, and an upper indexing channel 248U (FIG. 2) of the indexing portion 146 of the hitch plate 140. The first indexing pin 260F and the second indexing pin 260S are thus, engageably received. The illustrated stowed configuration also includes the ball hitch 270, and the ball mount portion 142 of the hitch plate 140, being received between the first sidewall 125 and the second sidewall 130 of the bracket 110, as shown in FIG. 4.

Optionally, embodiments may include one or more mechanisms for locking the indexing pins 260F, 260S in engagement with the indexing holes and channels. The person having ordinary skill can select such mechanisms from known structures as a matter of design choice; however, for example and without limitation, such structures include cotter pins and spring loaded ball catches.

Turning back to FIG. 2, the ball 270 is shown cooperatively engaging the ball mount portion 142 (FIG. 1) of the hitch plate 140. In this context, cooperative engagement means that the ball 270 is received by mounting aperture 144 and locked therein. The invention is not restricted to particular structures for cooperating with the mounting aperture 144 (FIG. 1); however, for purposes of illustration, one well known structure is a threaded post on a bottom side 274 of the ball 270, as shown in FIG. 2. While the post is out of view, a nut 272 threaded onto the post is visible in FIG. 2. Accordingly, the nut 272 and bottom side 274 of the ball 270 cooperate with the mounting aperture 144 to engage the ball 270 with the ball mount portion 142 of the hitch plate 140.

With collective reference to FIGS. 3 and 4, a ball hitch embodiment 100 is provided where a hitch plate 140, with or without a ball 270 installed thereupon, is adapted to rotate between a stowed configuration (FIG. 4), between two bracket walls, and a deployed configuration (FIG. 3). According to the illustrated embodiment, rotation is achieved by way of indexing pins 260 in cooperation with indexing channels 248 in the hitch plate 140 and indexing holes 135, 136 in the bracket walls. In the stowed configuration the, as shown in FIG. 4, the hitch plate and ball 270 are substantially enclosed by the bracket walls 125, 130. As used here, substantially enclosed means that the greater portion of the ball 270 is between the bracket walls 125, 130 and the greater portion of the hitch plate 140 is between the bracket walls 125, 130.

It will be apparent to those skilled in the art that the above methods and apparatuses may be changed or modified without departing from the general scope of the invention. The invention is intended to include all such modifications and alterations insofar as they come within the scope of the appended claims or the equivalents thereof.

I claim:

1. A folding trailer hitch, comprising:
   a shank;
   a bracket adjoined at a rear wall of the bracket to an end of the shank, wherein the bracket includes a first sidewall extending from the rear wall and a second sidewall extending from the rear wall;
   the first sidewall of the bracket having at least two columns of indexing holes;
   the second sidewall of the bracket having at least two columns of indexing holes;
   a hitch plate having a ball mount portion, a ball mounting aperture located in the ball mounting portion, and an indexing portion;
   an upper indexing channel extending from an upper opening in a first side of the indexing portion to an upper opening in a second side of the indexing portion; and
   a lower indexing channel parallel to the first indexing channel and extending from a lower opening in a first side of the indexing portion to a lower opening in a second side of the indexing portion.

2. The folding trailer hitch of claim 1 further comprising a ball hitch cooperatively engaging the ball mount portion of the hitch plate.

3. The folding trailer hitch of claim 1 further comprising a pair of indexing pins engageably receivable by the upper indexing channel and the lower indexing channel.

4. The folding trailer hitch of claim 1, wherein the ball mount portion of the hitch plate is receivable between the first sidewall of the bracket and the second sidewall of the bracket.

5. The folding trailer hitch of claim 4, wherein a ball hitch is receivable between the first sidewall of the bracket and the second sidewall of the bracket.

6. The folding trailer hitch of claim 1, wherein the second sidewall is parallel to the first side wall.

7. The folding trailer hitch of claim 1, wherein the at least two columns of indexing holes in the first sidewall of the bracket are parallel to each other and linearly arranged.

8. The folding trailer hitch of claim 1, wherein the at least two columns of indexing holes in the second sidewall of the bracket are parallel to each other and linearly arranged.

9. The folding trailer hitch of claim 1, wherein one column of indexing holes, of the at least two columns of indexing holes of the first sidewall, has a number of indexing holes exactly one greater than a second column of indexing holes of the at least two columns of indexing holes.

10. The folding trailer hitch of claim 9, wherein one column of indexing holes, of the at least two columns of indexing holes of the second sidewall, has a number of indexing holes exactly one greater than a second column of indexing holes of the at least two columns of indexing holes.

11. A folding trailer hitch, comprising:
   a shank;
   a bracket adjoined at a rear wall of the bracket to an end of the shank, wherein the bracket includes a first sidewall extending from the rear wall and a second sidewall extending from the rear wall;
   the first sidewall of the bracket having at least two columns of indexing holes;
   the second sidewall of the bracket having at least two columns of indexing holes;
   a hitch plate having a ball mount portion, a ball mounting aperture located in the ball mounting portion, and an indexing portion, wherein the ball mount portion of the hitch plate is receivable between the first sidewall of the bracket and the second sidewall of the bracket;
   an upper indexing channel extending from an upper opening in a first side of the indexing portion to an upper opening in a second side of the indexing portion;
   a lower indexing channel parallel to the first indexing channel and extending from a lower opening in a first side of the indexing portion to a lower opening in a second side of the indexing portion; and
   a pair of indexing pins engageably received by the upper indexing channel and the lower indexing channel.

* * * * *